(12) United States Patent
Fischer et al.

(10) Patent No.: US 6,380,711 B2
(45) Date of Patent: *Apr. 30, 2002

(54) BATTERY RECHARGING DEVICE AND METHOD AND AN AUTOMATIC BATTERY DETECTION SYSTEM AND METHOD THEREFOR (75) Inventors: Daniel Fischer, Waterloo; Steven Carkner, Manotick, both of (CA)

(73) Assignee: Research in Motion Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 09/725,833

(22) Filed: Nov. 29, 2000

Related U.S. Application Data (63) Continuation-in-part of application No. 09/343,304, filed on Jun. 30, 1999.

(51) Int. Cl.[7] .................................................. H02J 7/00
(52) U.S. Cl. ......................................... 320/106; 320/110
(58) Field of Search ................................ 320/106, 110, 320/136, 137, 148; 324/431, 433

(56) References Cited

U.S. PATENT DOCUMENTS 5,043,651 A    8/1991  Tamura .................... 320/136
5,861,729 A    1/1999  Maeda et al. ............. 320/106
6,011,843 A    1/2000  Hochman et al. ...... 379/211.04
6,191,551 B1 * 2/2001  Fischer et al. ............ 320/106

* cited by examiner

Primary Examiner—Jessica Han
Assistant Examiner—Lawrence Luk
(74) Attorney, Agent, or Firm—Jones, Day, Reavis & Pogue; Krishna K. Pathiyal, Esq.; Charles B. Meyer, Esq.

(57) ABSTRACT

A system includes a recharging device to which an electronic hand-held device powered by a battery can be connected. A controller associated with the recharging device performs a method of internal-device battery cell detection, i.e., distinguishing between NiMH/NiCd and other types of cells in the battery, before recharging the battery. A method determines the cell chemistry without any modifications to the battery and/or without any user input by performing tests on the battery. The tests include a Battery Voltage Test, an Internal Resistance Test, and a Timed Voltage Test. The testing is performed through a combination of hardware and software in the charging cradle. By performing the tests in a preferred order, detected alkaline, lithium, rechargeable alkaline, and carbon-zinc cells, damaged NiMH and NiCd cells, and close to fully charged NiMH and NiCd cells cause termination of a recharging operation before damage to the device or battery is sustained—without requiring input from a user.

42 Claims, 6 Drawing Sheets

BATTERY RECHARGING DEVICE AND METHOD AND AN AUTOMATIC BATTERY DETECTION SYSTEM AND METHOD THEREFOR

REFERENCE TO RELATED APPLICATION

This application is a continuation-in-part of the copending U.S. Utility application Ser. No. 09/343,304, entitled "Automatic Battery Detection System and Method for Detecting a Rechargeable Battery with Low Remaining Charge", filed on Jun. 30, 1999 and assigned to the assignee of the instant invention.

BACKGROUND OF THE INVENTION

The present invention relates to a battery recharging device and method which tests a battery to determine if it should not be recharged. More specifically, the present invention relates to an automatic battery detection system and method for use with an electronic device, such as wireless two-way communication devices, pagers, integrated email devices and cellular phones, powered by a battery. The electronic device is electrically connected to an associated recharging device to test the battery. This testing is performed by a controller that determines if the device includes a battery that should not be recharged. If the testing does not indicate that the battery should not be recharged, then a recharging operation is performed.

Generally, wireless transceivers, such as those used in radios, cell phones, pagers, etc., are powered by rechargeable batteries. Most commercially available rechargeable cells, such as Nickel Metal Hydride (NiMH) or Nickel-Cadmium (NiCd) cells, are recharged by an external charger (i.e., the user removes the batteries from the device and recharges them in the external charger). However, some devices recharge the batteries without removing them from the device.

To recharge the battery without removing it from the device, the type of cell within the battery must first be determined by the recharging device. Usually, the rechargeable batteries are modified to facilitate cell-type detection. This modification of the battery typically is done by adding a third terminal to the battery where detection is performed by a detector that measures the batteries characteristics through an electrical contact with the third terminal.

Another method of in-unit cell detection is performed through some form of user input such as a mechanical switch with an arrow that is lined up with one or more markings on the device. These markings represent chemical symbols or words that indicate the cell-type of the battery to the device charging the cell.

When recharging a battery though a charging cradle it is necessary to first test the battery to reduce the possibility of damaging either the device or the battery. If a device having a non-rechargeable battery is placed in the charging cradle during a recharging operation both the battery and the device could be damaged. Further, if a rechargeable battery is recharged when it is already almost fully charged, the number of charging cycles is lowered and the lifetime of the battery is drastically reduced.

SUMMARY OF THE INVENTION

According to the present invention, a recharging device, which may for example be a charging cradle, is electrically connected to an electronic device powered by a battery. A controller performs a method of internal-device battery cell detection, i.e., distinguishing between NiMH/NiCd and other types of cells in the battery, before recharging the battery. A method determines the cell chemistry without any modifications to the battery and/or without any user input by performing a plurality of tests. The tests may include a Battery Voltage Test, an Internal Resistance (IR) Test, and a Timed Voltage Test. The tests are preferably executed in a predetermined order. The testing is performed through a combination of hardware and software which may be in the charging cradle.

One advantage of the present invention is that alkaline, lithium, rechargeable alkaline, and carbon-zinc cells are detected and not recharged while the battery remains in the device without modifying the battery, which protects the device from being damaged.

Another advantage of the present invention is that damaged NiNH and NiCd cells are detected and not recharged while the battery remains in the device without modifying the battery, which protects the device from being damaged.

Still another advantage of the present invention is that close to fully charged NiMH and NiCd cells are detected and not recharged while the battery remains in the device without modifying the battery, which extends the life of the battery and prevents overcharging of the battery.

Another advantage of the present invention is that the detection process may be conducted without requiring input from a user.

These are just a few of the many advantages of the invention, which is described in more detail below in terms of a preferred embodiment. As will be appreciated, the invention is capable of other and different embodiments, and its several details are capable of modifications in various respects, all without departing from the invention. Accordingly, the drawings and description of the preferred embodiments are to be regarded as illustrative in nature and not restrictive.

BRIEF DESCRIPTION OF THE DRAWINGS

The present invention will be apparent to those skilled in the art upon reading the following description in view of the accompanying drawings, wherein.

DETAILED DESCRIPTION OF THE PREFERRED EMBODIMENT

Figure 1:
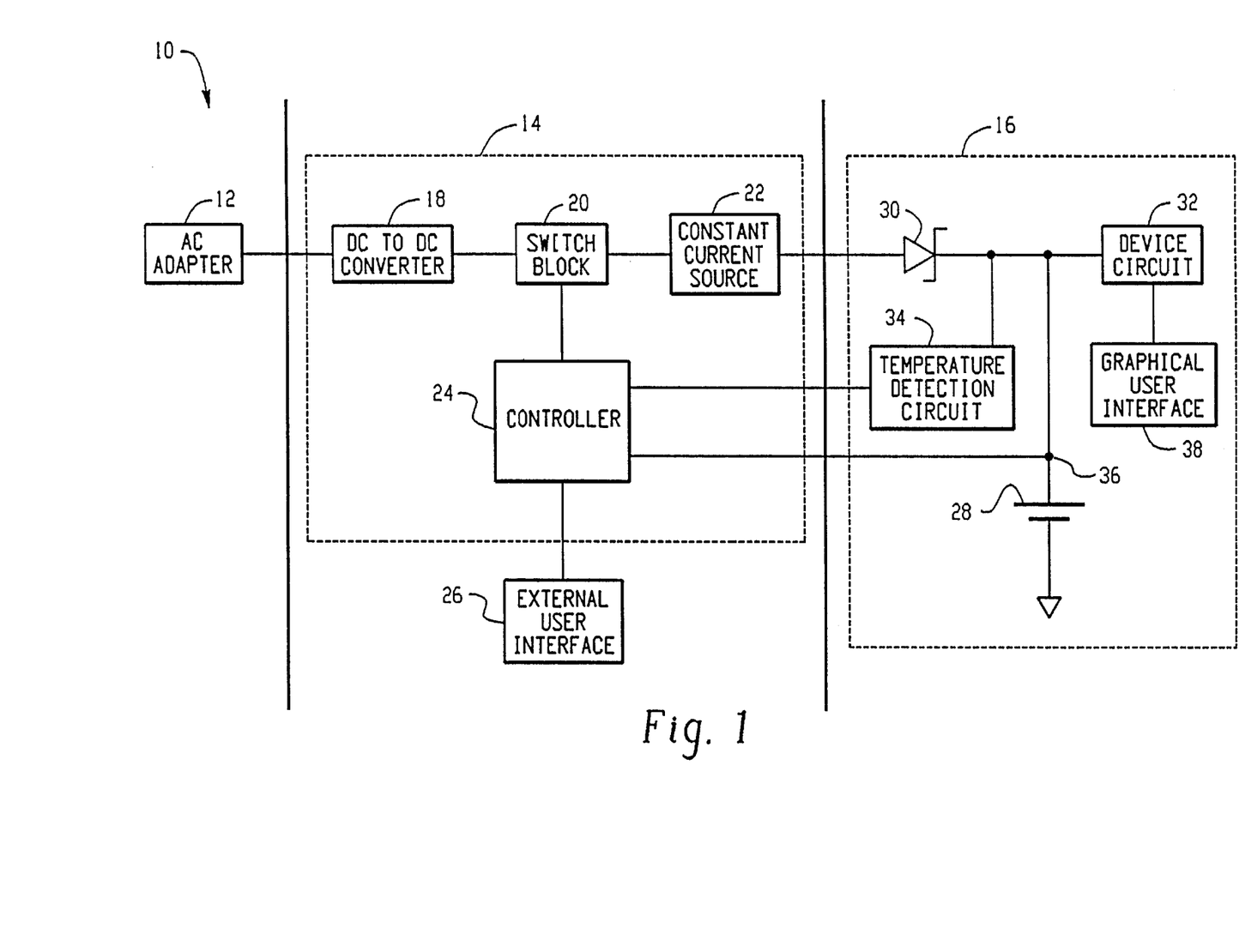
FIG. 1 is a high-level block diagram of a system according to a preferred embodiment of the present invention.

An apparatus 10 comprising a preferred embodiment of the present. invention is shown in FIG. 1. The apparatus 10 includes an external power source adapter 12, preferably an AC adapter, a recharging device 14 and an electronic device 16. The device 16 is preferably a hand-held electronic device such as those disclosed in copending U.S. patent application Ser. No. 09/106,585, entitled "Hand-Held Electronic Device With a Keyboard Optimized for Use With The Thumbs", filed on Jun. 29, 1998, assigned to the assignee of the instant invention and incorporated into this disclosure by reference. The recharging device 14 is preferably a charging cradle or recharging device adapted for use with the electronic device 16. It is to be appreciated that although these are the preferred devices, other devices for use with the present invention that operate in a similar manner could also be used. For example, the AC adapter 12 could be integrated with the recharging device 14 into a single recharging unit.

With continuing reference to FIG. 1, the recharging device 14 preferably includes a DC—DC converter 18, a switch block 20, a constant current source 22, a controller 24, and an external user interface 26. The converter 18 is preferably a 12V to 5V converter, which converts voltage received from the adapter 12 and sends the converted voltage to the switch block 20. Electricity flowing through the switch block 20 to the constant current source 22 is controlled by the controller 24.

The device 16 preferably includes a battery 28, a Schottky diode 30, a device circuit 32, and a temperature detection circuit 34. Through use of the Schottky diode 30, the constant current source 22 in the recharging device 14 is protected from reverse current since the diode 30 only permits current flow into the electronic device 16. The controller 24 performs tests on the battery 28 by reading the voltage at node 36 of the device 16 to determine if the battery 28 contains rechargeable NiMH or NiCd cells that need to be recharged. This determination is actually made by determining that the battery does not contain cells that should not be recharged, as will become apparent from the description below. The battery 28 is recharged by the constant current source 22 when the controller 24 determines that the battery 28 is a rechargeable battery that is in need of recharging. Also, the controller 24 monitors other parameters of the electronic device 16, such as temperature, through a temperature detection circuit 34.

The device circuit 32 is preferably configured to operate as a wireless transceiver, such as a two-way paging computer, a portable electronic messaging device, or a hand held e-mail client. An example of such a device is set forth in the U.S. patent application Ser. No. 09/106,585 referenced above. Although this is the preferred device circuit 32, other types of circuits could be utilized in the present invention.

The external interface 26 of the recharging device 14 is preferably either a light-emitting diode (LED) or a graphical user interface (GUI) that alerts a user of the device 16 the status of the testing being performed. For example, an LED illuminates continuously during the detecting. Then, if the controller 24 determines the battery 28 contains NiCd or NiMH cells that need to be recharged, the LED blinks until a recharging cycle is completed at which time the LED is illuminated continuously again. In the alternative embodiment with the GUI, the external interface 26 may be located on the recharging device 14 or may be a computer monitor (not shown) that is coupled to the recharging device 14. Further, the information can alternatively be displayed on a GUI 38 of the pager 16.

Figure 2:
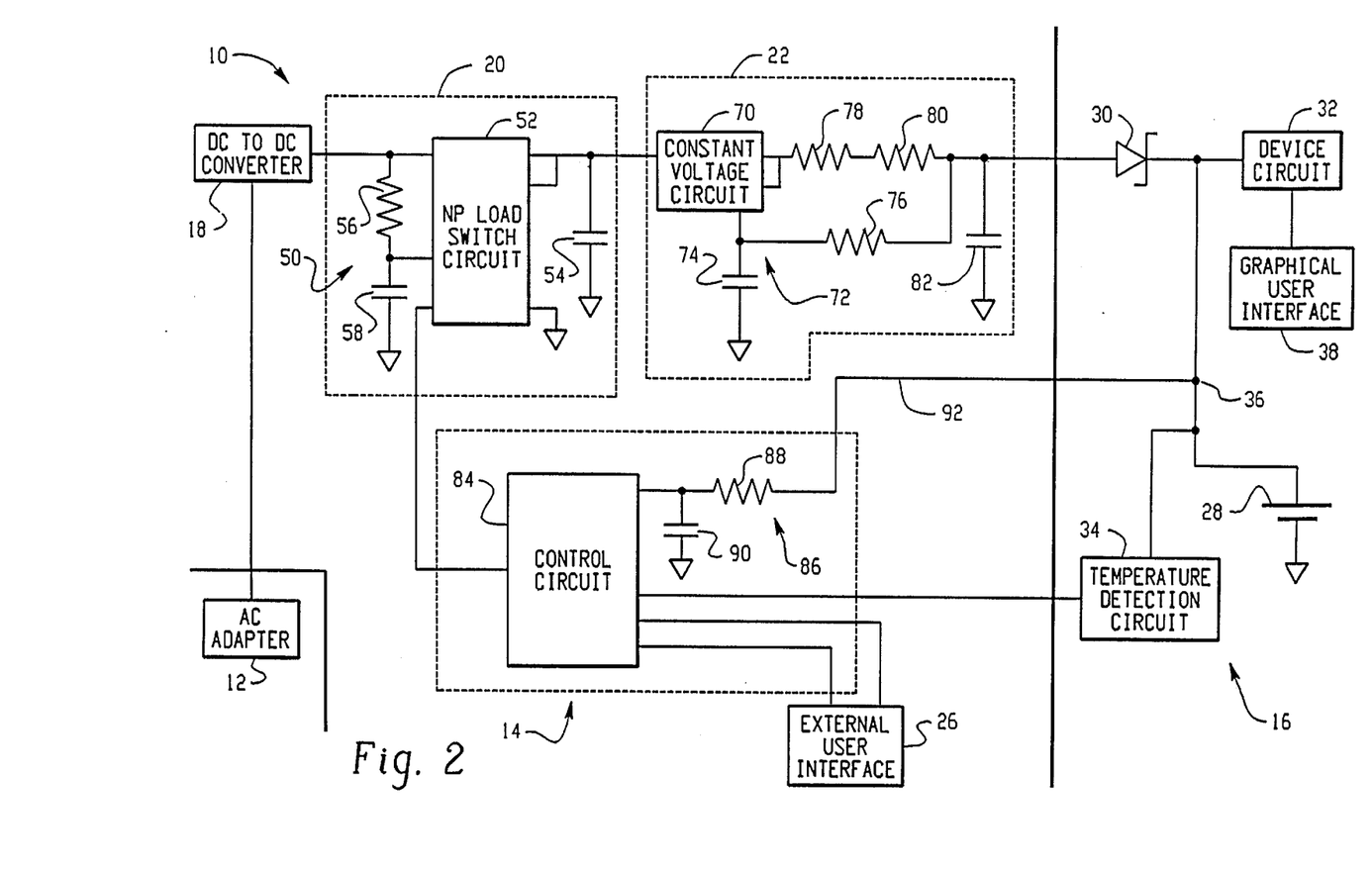
FIG. 2 is a detailed circuit architecture of the system of FIG. 1 according to a preferred embodiment of the present invention.

Turning to FIG. 2, a preferred circuit architecture of the components in the recharging device 14 are shown in more detail. The switching block 20 controls the flow of current from the converter 18 to the constant current source 22 by only allowing current to pass through it when it is turned ON by the controller 24. This occurs when the controller 24 determines the battery 28 needs to be recharged. Further, when current flows through switch block 20 it acts as a level shifting switch. The switch block 20 includes a low pass filter 50, a NP load switch circuit 52, and a filtering capacitor 54. The low pass filter 50, which includes resistor 56 and capacitor 58, filters the power from the converter 18. Preferably, the low pass filter 50 includes a 100 k Ω resistor 56 and a 1000 pF capacitor 58, and the value of the filtering capacitor 54 is 1 uF capacitor.

Figure 3:
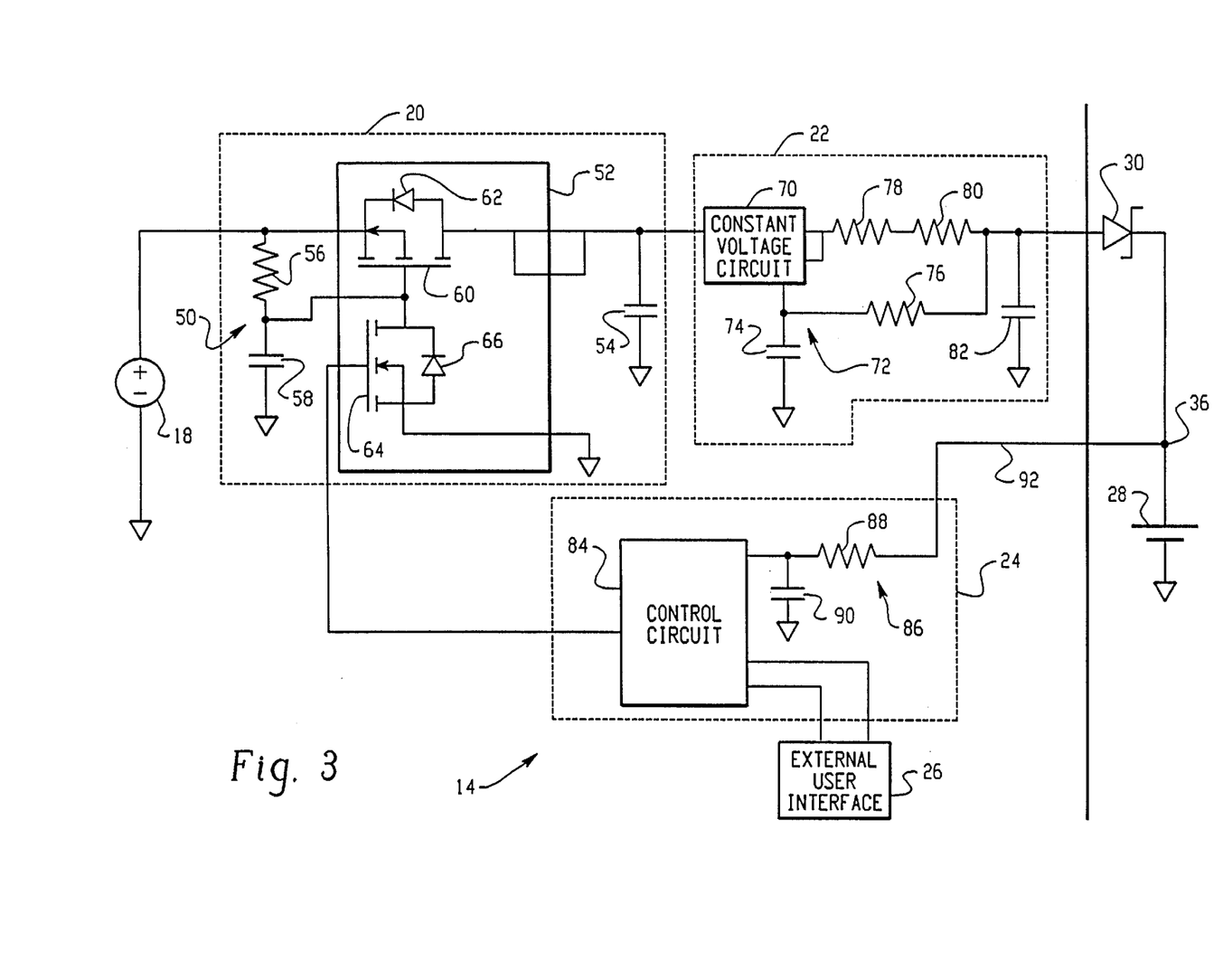
FIG. 3 is a detailed circuit architecture of a section of the system of FIG. 1 according to a preferred embodiment of the present invention.

As seen in FIG. 3, a preferable circuit for the NP load switch circuit 52 is shown, which is a FCD6363L connection circuit manufactured by Fairchild Semiconductor Corporation. This connection circuit 52 includes a p-channel, high current MOSFET 60 with a diode 62 connected drain to source across the FET 60 and an n-channel, low current MOSFET 64 with a diode 66 connected source to drain across the FET 64. By connecting the low pass filter 50 to the MOSFET 60 in this configuration, the MOSFET 60 acts as a switch. Further, the MOSFET 64 is configured as a level shifting switch that is switched to an ON state by the controller 24 by biasing the gate of the MOSFET 64. This allows a 5 volt processor to control a 12 volt signal. Then, based on the ON state of MOSFET 64, the gate of MOSFET 60 is biased, switching it to an ON state. In the ON state, the MOSFET 60 allows electricity to flow through the switch block 20 to the constant current source 22 via the filtering capacitor 54.

With continuing reference to FIGS. 2–3, the constant current source 22 includes a constant voltage circuit 70 and a low pass filter 72. A capacitor 74 and a resistor 76 make up the low pass filter 72. The constant current source 22 further includes a resistor 78 across which there is a constant voltage from the constant voltage circuit 70 such that the constant voltage is converted into the constant current. This constant current flows into the electronic device 16. Further, the constant current source 22 only conducts when switch block 20 is turned on by the controller 24 during a recharging operation of battery 28. Preferably, the constant voltage circuit 70 is a EZ1117CM circuit manufactured by Semtech Corporation. Also, preferably the value of capacitor 74 is 0.1 uF, the value of resistor 76 is 383 Ω, the value of resistor 78 is 2 Ω, and the value of capacitor 74 is 10 uF.

As also seen in FIGS. 2–3, the controller 24 includes a control circuit 84 and a low pass filter 86. The low pass filter 86, which includes a resistor 88 and a capacitor 90, filters signals flowing through a coupling element 92 between the node 36 and the control circuit 84. Preferably, the control circuit 84 is a PIC16C711 control chip manufactured by Microchip Technology, Inc., the value of resistor 88 is 10 k Ω, and the value of capacitor 90 is 6800 pF.

In this configuration, through the method 100 described in detail below, the controller 24 determines what type of cells are contained in the battery 28 without any previous knowledge of the cell-type. The determination is made when the device 16 is electrically connected to the recharging device 14. Where the device 14 is a cradle or holder as described above, the cell type determination operations are executed when device 16 is properly inserted into the holder 14. Once proper connection or insertion is detected, the controller 24 starts testing of the battery 28. If the testing is successful, i.e., the battery 28 is rechargeable and in need of recharging, the controller 24 turns ON the FET 64 by biasing its gate. Then, once the FET 64 is turned ON, the amplifying FET 60 is turned ON, which permits current flow from the converter 18 to the constant current source 22. The current then passes through the constant current source 22 into the device 16 to recharge the battery 28.

Figure 4:
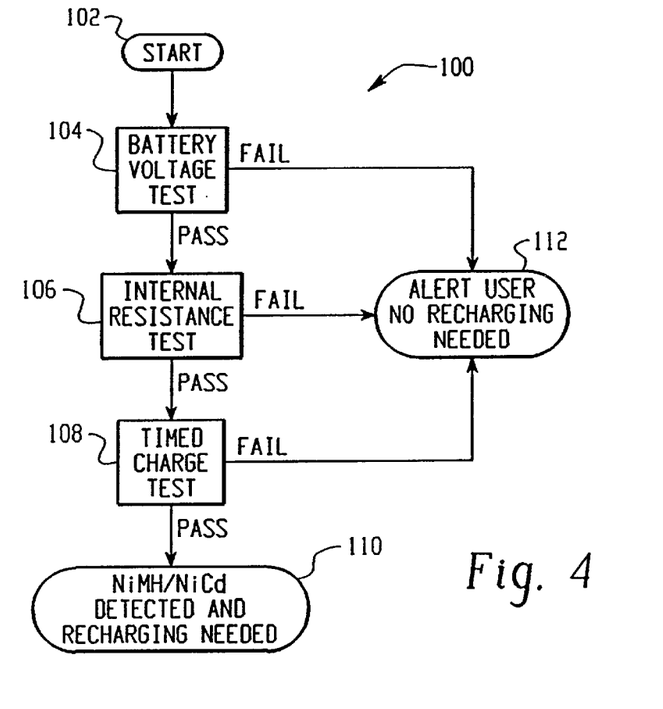
FIG. 4 is a flow chart of the overall battery detection method according to a preferred embodiment of the present invention.

FIG. 4 sets forth a preferred method 100 of cell detection performed by the controller 24, which allows for differentiation between NiMH/NiCd cells and other cells. By applying this method of testing, the controller 24 detects and does not recharge an alkaline, lithium, rechargeable alkaline, and carbon-zinc cells, damaged NiMH and NiCd cells, and close to fully charged NiNt and NiCd cells.

With continuing reference to FIG. 4, once it has been determined that the device 16 is properly connected to the recharging device 14, the testing is started at step 102. A plurality of tests is preferably performed by the controller 24 to determine the presence of a "good" NiNH or NiCd cell in the battery 28. Three of the plurality of tests include a Battery Voltage Test 104, an Internal Resistance (IR) Test 106, and a Timed Charge Test 108. As shown in step 110, for a successful detection of a NiMH or NiCd cell, these tests 104–108 should be passed in a predetermined order, although alternatively they could be configured to operate in a different order. If any of the three tests 104–108 fail, then at step 112 a user is alerted, via the external interface 26, that the recharging operation is being terminated. These tests 104–108 are described in more detail below with reference to FIGS. 5–7.

Figure 5:
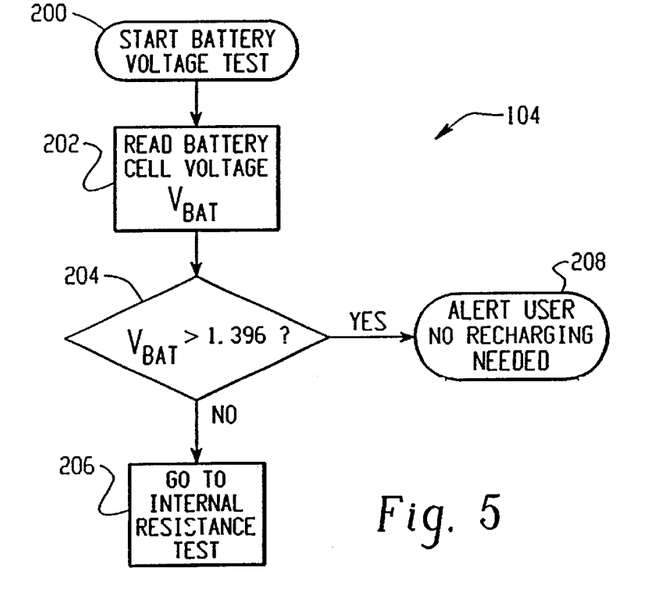
FIG. 5 is a flow chart of a Battery Voltage Test according to a preferred embodiment of the present invention.

FIG. 5 sets forth the preferred Battery Voltage Test method 104. The Battery Voltage Test 104 is started at step 200. At step 202 the controller 24 reads the voltage $V_{BAT}$ of the battery 28 at node 36 through the coupling element 92. Then, at step 204, the controller 24 determines if the voltage $V_{BAT}$ is below a certain threshold value, preferably 1.396 V. If the voltage $V_{BAT}$ is below the threshold value, then the Battery Voltage Test 104 test was successful and the method 100 proceeds to the IR Test 106 at step 206. If the voltage $V_{BAT}$ is equal to or above the threshold value, then the user is alerted, via the external interface 26, that the recharging operation is being terminated to ensure there is no damage to the battery 28 or the device 16.

In the preferred embodiment of the present invention, the controller 84 reads the battery voltage 16 times. The purpose of sampling the voltage 16 times is to remove any random (or white) noise that could be seen on the coupling element 92. The 16 samples are then averaged as $V_{BAT}$ and compared to the threshold voltage of 1.396 V. The reason for performing the Battery Voltage Test 104 is because most fully charged alkaline and lithium AA cells have voltages above the specified threshold. Further, most fully charged NiMH and NiCd cells have a terminal voltage in the neighbourhood of the threshold voltage. Therefore, the Battery Voltage Test 104 detects both fully charged NiMH and NiCd cells (to prevent overcharging) and non-rechargeable cells.

Figure 6:
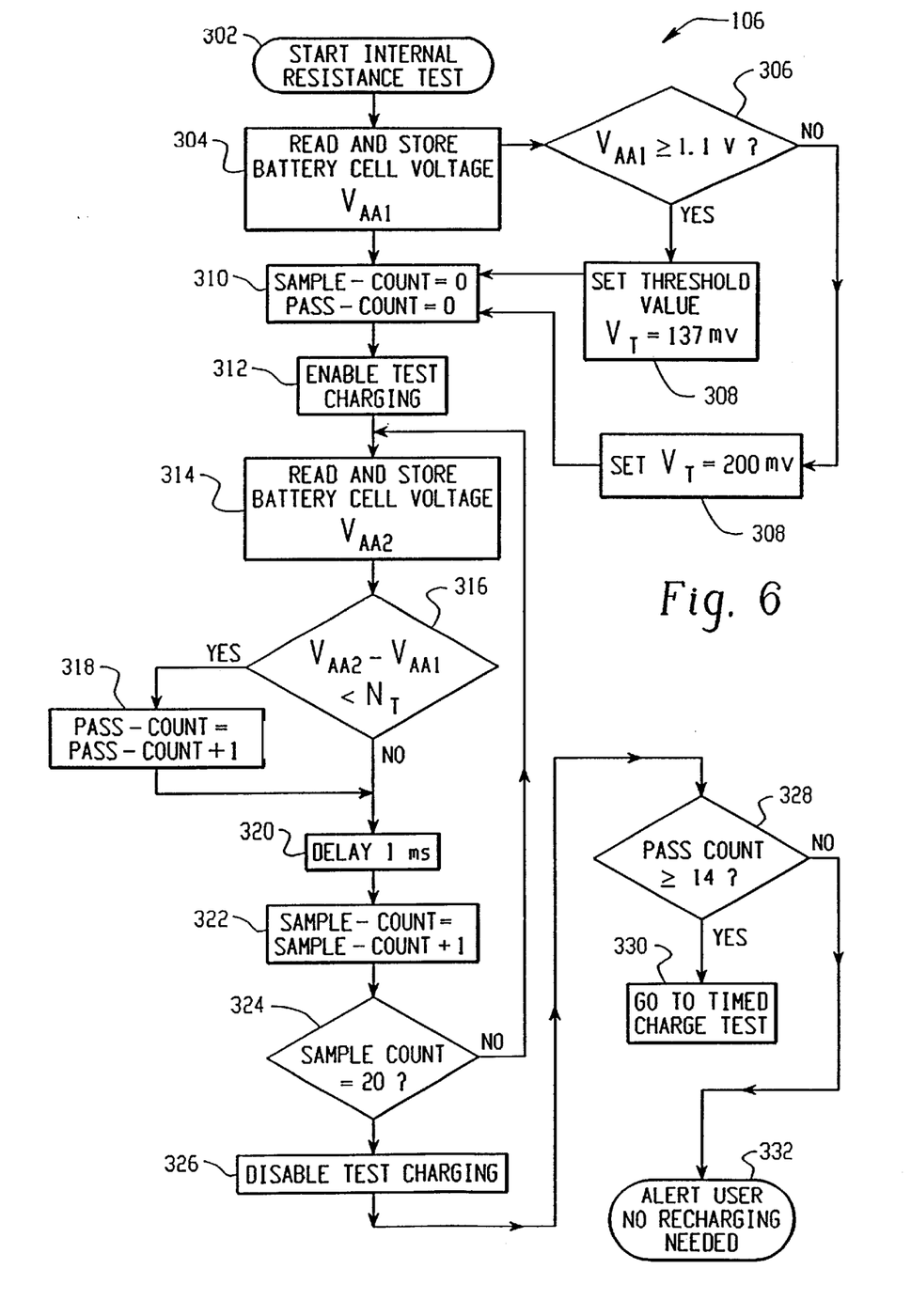
FIG. 6 is a flow chart of an IR Test according to the preferred embodiment of the present invention.

FIG. 6 sets forth the preferred steps of the IR Test 106. The IR Test 106 determines the internal resistance of the battery 28 inside the device 16 to determine the cell-type. The NiMH and NiCd cells have a low internal resistance (due to their construction) such that their lower IRs allow them to be differentiated by this test. The values, $V_{AA1}$ and $V_{AA2}$, are measured by determining the pulse height voltage response to a 20 ms pulse of known current from the constant current source. The voltages, $V_{AA1}$ and $V_{AA2}$, are proportional to the internal resistance of the battery and are used directly as a measure of the battery's internal resistance.

The IR Test 106 is performed by the controller 24 as follows. Once the Battery Voltage Test 104 has passed, at step 302 the IR Test 106 is started. A first voltage $V_{AA1}$ of the battery 28 is read and stored at step 304. Then, at step 306 the first voltage $V_{AA1}$ is compared to a predetermined voltage value, preferably 1.1 V. Based on this comparison, at step 308 a threshold voltage value $V_T$ is determined and set so that it is used during testing. Preferably, the threshold voltage $V_T$ is set at 137 mV if $V_{AA1}$ is equal to or greater than 1.1 v or $V_T$ is set at 200 mV if $V_{AA1}$ is less than 1.1 V. Then, a sample-count value and a pass-count value are both set to 0 at step 310. At step 312, the controller 24 enables test charging of the battery 28, preferably at a rate of 630 mA for 20 ms. During the test charging, a second voltage value $V_{AA2}$ is stored at step 314. This second value $VAA_2$ is then subtracted from the first value $V_{AA1}$ to determined a difference value that is then compared to the threshold voltage $V_T$ at step 316. If the difference $V_{AA1}-V_{AA2}$ is less than the threshold voltage $V_T$, then (1) the pass-count value is incremented to pass-count +1 at step 318, (2) the testing is delayed a predetermined time period at step 320, which is preferably 1 ms, and (3) the sample-count value is incremented to sample-count +1 at step 322. Otherwise, if the difference $V_{AA1}-V_{AA2}$ is equal to or above the threshold voltage $V_T$, then only steps 320 and 322 are performed and the pass-count value step 318 is by-passed.

At step 324, the controller 24 determines whether or not 20 voltage samples $V_{AA2}$ have been read, stored, and used to calculate the difference value for the comparison to the threshold value. If it is determined that there have been less than 20 samples, steps 314–324 are repeated until the sample-count is equal to 20. Otherwise, if it is determined that 20 samples have been taken, then the test charging is disabled at step 326. After disabling the test charging at step 326, a determination is made at step 328 if the pass-count value is greater then or equal to 14, i.e., at least 14 times during the 20 samples the voltage difference $V_{AA1}-V_{AA2}$ was less than the threshold voltage $V_T$ at step 316. If the pass-count value is equal to or above 14, then the method 100 proceeds to the Timed Charge Test 108 at step 330. Otherwise, if the pass-count value is less than 14, then the user is alerted at step 332, via the external interface 26, that the recharging operation is being terminated.

The threshold voltage $V_T$ of 137 mV was chosen because most healthy NiMH and NiCd AA cells have a jump in their terminal voltage, during the 20 ms charge, of less than 137 mV. The NiMH and NiCd cells that do not fall below this value are usually damaged cells. Also, the threshold voltage $V_T$ of 200 mV was chosen because as cell voltage decreases, the internal resistance of the AA cell rises and this must be taken into account. Further, the predetermined pass-count value of 14 was used because a non-insignificant noise floor is seen at the input pin to an A/D converter (not shown) in the control circuit 84. Therefore, having 14 sample results (of the subtraction) is required to accurately track the shape of the pulse created by charging for 20 ms.

Figure 7:
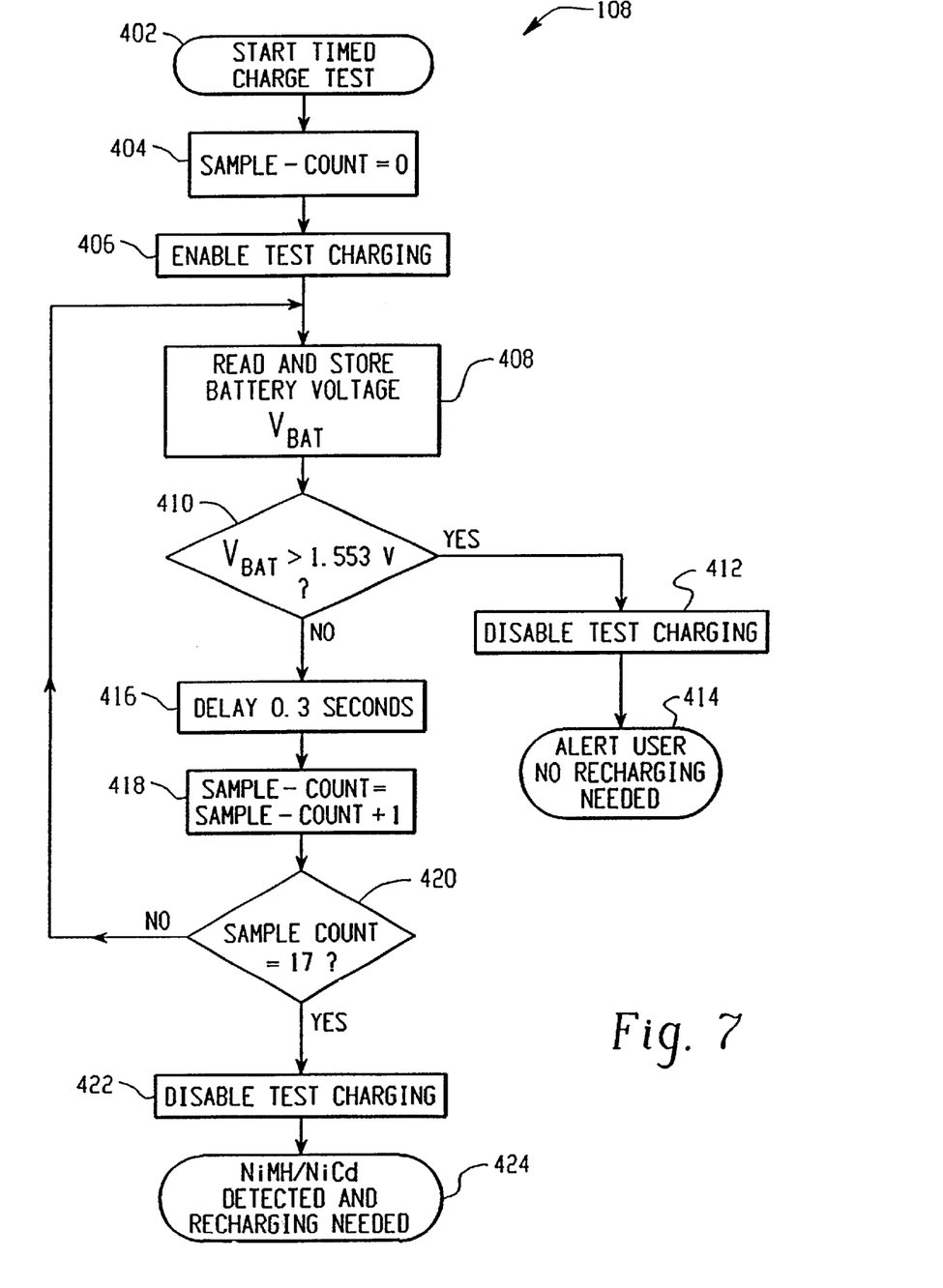
FIG. 7 is a flow chart of a Timed Charge Test according to a preferred embodiment of the present invention.

FIG. 7 sets forth the preferred steps of the Timed Charge Test 108. The method 100 proceeds to the Timed Charge Test 108 at step 402 once the battery 28 has passed the Battery Voltage Test 104 and the IR Test 106. At step 404, a sample-count value is set to 0. Then, test charging of the battery 28 is enabled at step 406. The controller 24 enables charging (at a rate of 630 mA) into the cells within the battery 28 for a period of five seconds. During this period of time, the controller 24 measures the voltage of battery 28 at node 30 in 17 equally time-spaced sets of 16 samples per set, which are then averaged as $V_{BAT}$ at step 408. At step 410, it is determined if $V_{BAT}$ is above a predetermined threshold value, preferably 1.553 V. If $V_{BAT}$ is above this threshold value, then the test charging is disabled at step 412. If this occurs, the user is alerted at step 414, via the external user interface 26, that the recharging operation is being terminated. Otherwise, if the $V_{BAT}$ is below the threshold value, the Timed Charge Test 108 is delayed a predetermined time period, preferably 0.3 seconds, at step 416, and then the sample-count value is increased by 1 to sample-count +1 at step 418.

Following the delay at step 416 and increment at step 418, the sample-count value is compared to a predetermined sample-count value at step 420, where the predetermined sample-count value is preferably 17. If the sample-count value is less than 17, then steps 408–418 are repeated until the sample-count is equal to 17. Otherwise, the test charging is disabled at step 422, and at step 424 the cell inside the battery 28 is considered to be a NiMH or NiCd cell in need of recharging. If this is determined at step 424, the controller 24 will bias the gate of the MOSFET 64 so that it is in an ON state allowing electricity to flow through MOSFET 64 and the constant current source 22 to the device 16 to begin recharging the battery 28.

The value of 1.553 V as the threshold level for the $V_{BAT}$ comparison is used because most NiCd and NiMH AA cells, when charged for five seconds at a rate of 630 mA, have terminal voltages that rise to less than 1.553 V. However, NiMH and NiCd cells that are not ready to be recharged have terminal voltages that are above 1.553 V. Thus this test 108, according to a preferred embodiment of the present invention, detects and does not recharge NiMH or NiCd cells that are close to fully charged. The Timed Charge Test 108 detects and does not recharge any non-NiMH and non-NiCd AA cells 28 that may have passed the previous two tests 104 and 106. These three tests 104–108 in the preferred combination accurately detect the presence of either a non-NiCd/NiMH cell or a near fully charged NiCd/NiMH cell when the electronic device 16 is positioned in the holder 14. Finally, although some non-preferred cells may pass any of the three tests 104–108 individually, it is doubtful that the cells would not be detected and pass all three of the battery detection tests 104–108 in the combination as taught in the preferred embodiment of the present invention.

The invention has been described with reference to preferred embodiments. Those skilled in the art will perceive improvements, changes, and modifications. Such improvements, changes and modifications are intended to be covered by the appended claims.

We claim:

1. An apparatus comprising:
   a power source;
   an electronic hand-held device powered by the power source; and
   recharging means including a controller that is operative to determine, prior to beginning a recharging operation, if the power source should not be recharged when the electronic hand-held device is operatively connected to the recharging means.

2. An apparatus according to claim 1, wherein the controller determines if the power source is a non-rechargeable power source, a damaged or abnormal rechargeable power source or a nearly fully charged rechargeable power source to thereby determine that the power source should not be recharged.

3. An apparatus according to claim 1, wherein the power source is replaceable by a user of the hand-held electronic device.

4. An apparatus according to claim 1, wherein the power source is a battery.

5. An apparatus according to claim 1, wherein the electronic hand-held device is a wireless transceiver.

6. An apparatus according to claim 5, wherein the wireless transceiver is a two-way paging computer.

7. An apparatus according to claim 5, wherein the wireless transceiver is a portable electronic messaging device.

8. An apparatus according to claim 4 further comprising:
   a user interface coupled to the controller which is configured to provide a user information regarding a status of testing performed on the battery.

9. An apparatus according to claim 8, wherein the user interface comprises a light-emitting diode.

10. An apparatus according to claim 8, wherein the user interface comprises a graphical user interface.

11. An apparatus according to claim 1, wherein the controller is configured to perform an internal resistance (IR) test.

12. An apparatus according to claim 11, wherein when performing the IR test the controller is operative to determine if a difference between a first power source voltage value and a second power source voltage value is below a predetermined threshold value a predetermined number of times.

13. An apparatus according to claim 1, wherein the controller is configured to perform a timed charge test.

14. An apparatus according to claim 13, wherein when performing the timed charge test the controller is operative to determine if a power source voltage value is below a predetermined threshold value.

15. An apparatus according to claim 1, wherein the controller is configured to perform a battery voltage test and an IR test.

16. An apparatus according to claim 15, wherein:
   when performing the battery voltage test the controller is operative to determine if a first power source voltage value is below a first threshold value; and
   when performing the IR test the controller is operative to determine if a difference between a second power source voltage value and a third power source voltage value is below a second predetermined threshold value a predetermined number of times.

17. An apparatus according to claim 1, wherein the controller is configured to perform a battery voltage test and a timed charge test.

18. An apparatus according to claim 17, wherein:
   when performing the battery voltage test the controller is operative to determine if a first power source voltage value is below a first threshold value; and
   when performing the timed charge test the controller is operative to determine if a second power source voltage value is below a second predetermined threshold value.

19. An apparatus according to claim 1, wherein the controller is configured to perform an IR test and a timed charge test.

20. An apparatus according to claim 19, wherein:
   when performing the IR test the controller is operative to determine if a difference between a first power source voltage value and a second power source voltage value is below a first predetermined threshold value a predetermined number of times; and
   when performing the timed charge test the controller is operative to determine if a third power source voltage value is below a second predetermined threshold value.

21. An apparatus according to claim 1, wherein the controller is configured to perform a battery voltage test, an IR test, and a timed charge test.

22. An apparatus according to claim 21, wherein:

when performing the battery voltage test the controller is operative to determine if a first power source voltage value is below a first threshold value;

when performing the IR test the controller is operative to determine if a difference between a second power source voltage value and a third power source voltage value is below a second predetermined threshold value a predetermined number of times; and when performing the timed charge test the controller is operative to determine if a fourth power source voltage value is below a third predetermined threshold value.

23. An apparatus according to claim 1, wherein the controller is configured to sequentially perform a battery voltage test, an IR test, and a timed charge test.

24. An apparatus according to claim 23, wherein when performing the battery voltage test the controller is operative to determine if a first power source voltage value is below a first threshold value;

when performing the IR test the controller is operative to determine if a difference between a second power source voltage value and a third power source voltage value is below a second predetermined threshold value a predetermined number of times; and when performing the timed charge test the controller is operative to determine if a fourth power source voltage value is below a third predetermined threshold value.

25. An apparatus according to claim 1, wherein the controller is configured to measure predetermined characteristics of the power source.

26. An apparatus according to claim 1, wherein the controller is configured to perform a battery voltage test.

27. An apparatus according to claim 26, wherein when performing the battery voltage test the controller is operative to determine if a power source voltage value is below a threshold value.

28. A method comprising the steps of:

powering an electronic hand-held device with a power source;

testing the power source when the electronic hand-held device is operatively connected to a recharging means, the testing being performed by a controller, prior to beginning a recharging operation, to determine if the power source should not be recharged; and controlling an operation of the electronic hand-held device based on the testing step.

29. A method according to claim 28, wherein the controller determines if the power source is a non-rechargeable power source, a damaged or abnormal rechargeable power source or a nearly fully charged rechargeable power source to thereby determine that the power source should not be recharged.

30. A method according to claim 28, wherein the testing step comprises performing a power source voltage test.

31. A method according to claim 28, wherein the testing step comprises performing an IR test.

32. A method according to claim 28, wherein the testing step comprises performing a timed charge test.

33. A method according to claim 28, wherein the testing step comprises:

performing a power source voltage test; and performing an IR test.

34. A method according to claim 28, wherein the testing step comprises:

performing a power source voltage test; and performing a timed charge test.

35. A method according to claim 28, wherein the testing step comprises:

performing an IR test; and performing a timed charge test.

36. An apparatus for testing a battery, the apparatus comprising:

an electronic device powered by the battery;

recharging means that comprises a controller that is operative to perform tests on the battery when the electronic device is operatively connected to the recharging means, the tests being operative to determine, prior to beginning a recharging operation, if the battery should not be recharged.

37. An apparatus according to claim 36, wherein the controller determines if the battery is a non-rechargeable battery, a damaged or abnormal rechargeable battery or a nearly fully charged rechargeable battery to thereby determine that the battery should not be recharged.

38. An apparatus according to claim 36, wherein the electronic device is a hand-held two-way paging computer.

39. An apparatus according to claim 36, wherein the electronic device is a portable electronic messaging device.

40. An apparatus according to claim 36, wherein the electronic device is a hand-held email client.

41. A method for determining if a battery powering an electronic device should not be recharged the method comprising the steps of:

performing a battery voltage test on the battery;

performing a IR test on the battery; and performing a timed charge test on the battery;

the testing of the battery being performed by a controller in a recharging means when the electronic device is operatively connected to the recharging means, prior to beginning a recharging operation.

42. A method according to claim 41, wherein the IR test is only performed if the power source voltage test passes, and the timed charge test is only performed if the IR test passes and all the tests must pass for a recharging operation to begin for the battery.

* * * * *